United States Patent
Cheng et al.

(10) Patent No.: US 12,057,984 B2
(45) Date of Patent: Aug. 6, 2024

(54) COMMUNICATION DEVICE AND METHOD OF HANDLING PAPR

(71) Applicant: Realtek Semiconductor Corp., HsinChu (TW)

(72) Inventors: Sheng-Lung Cheng, HsinChu (TW); Kun-Chien Hung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/112,512

(22) Filed: Feb. 22, 2023

(65) Prior Publication Data
US 2023/0308332 A1    Sep. 28, 2023

(30) Foreign Application Priority Data

Mar. 23, 2022   (TW) .................................. 111110715

(51) Int. Cl.
*H04L 27/26*    (2006.01)

(52) U.S. Cl.
CPC ............................... *H04L 27/2621* (2013.01)

(58) Field of Classification Search
CPC ............. H04L 27/2601; H04L 27/2614; H04L 27/2621; H04L 27/2623; H04L 27/2624; H04L 27/2626; H04L 27/26265; H04L 27/2634; H04L 27/26362
See application file for complete search history.

(56) References Cited

U.S. PATENT DOCUMENTS

| | | | |
|---|---|---|---|
| 6,556,557 B1 * | 4/2003 | Cimini, Jr. ........... | H04L 27/2614 370/335 |
| 7,292,639 B1 * | 11/2007 | Demirekler ......... | H04L 27/3411 375/346 |
| 7,315,580 B2 * | 1/2008 | Feng ................... | H04L 27/2621 375/295 |
| 7,321,629 B2 * | 1/2008 | Feng .................... | H04L 1/0041 375/259 |

(Continued)

OTHER PUBLICATIONS

Cimini, Peak-to-Average Power Ratio Reduction of an OFDM Signal Using Partial Transmit Sequences, IEEE Communications Letters, vol. 4, No. 3, pp. 86-88, Mar. 2000.

(Continued)

*Primary Examiner* — James M Perez
(74) *Attorney, Agent, or Firm* — Winston Hsu (57) ABSTRACT

A communication device for handling a Peak-to-Average Power Ratio (PAPR), includes a transforming module, configured to perform a first plurality of inverse fast Fourier transforms (IFFTs) on a plurality of coefficients in a scene according to a first inverse fast Fourier transform (IFFT) size and the scene, to obtain a plurality of results; a processing module, coupled to the transforming module, configured to obtain a plurality of norms of the plurality of results, and to obtain a plurality of values of the plurality of coefficients; and a transmitting module, coupled to the processing module, configured to perform a second plurality of IFFTs on a plurality of frequency-domain signals according to a second IFFT size, the plurality of coefficients with the plurality of values and the scene, to obtain a plurality of time-domain signals, wherein the second IFFT size is greater than the first IFFT size.

10 Claims, 5 Drawing Sheets

(56) References Cited

U.S. PATENT DOCUMENTS

| | | | |
|---|---|---|---|
| 7,583,586 B2* | 9/2009 | Park | H04L 5/0048 370/335 |
| 7,623,442 B2* | 11/2009 | Laroia | H04L 5/023 370/335 |
| 7,720,175 B2* | 5/2010 | Yeon | H04L 27/2624 375/296 |
| 7,809,078 B2* | 10/2010 | Hori | H04L 27/2614 375/295 |
| 7,848,446 B2* | 12/2010 | Haartsen | H04L 27/2614 375/285 |
| 7,929,511 B2* | 4/2011 | Kwon | H04L 27/26522 370/344 |
| 8,139,666 B2* | 3/2012 | Hung | H04B 17/364 375/267 |
| 8,218,658 B2* | 7/2012 | Hung | H04L 25/0226 370/344 |
| 8,275,079 B2* | 9/2012 | Hung | H04L 27/2647 375/285 |
| 8,300,713 B2* | 10/2012 | Hung | H04L 27/2675 375/267 |
| 8,391,383 B2* | 3/2013 | Ponnampalam | H04L 27/2627 375/267 |
| 8,406,113 B2* | 3/2013 | Zhao | H04L 27/2623 370/204 |
| 8,873,658 B2* | 10/2014 | Kwon | H04L 27/2621 375/267 |
| 8,891,674 B2* | 11/2014 | Park | H04L 27/2618 375/268 |
| 8,995,542 B2* | 3/2015 | Kumar | H04L 27/2615 375/267 |
| 8,995,568 B1* | 3/2015 | Wu | H04K 1/006 375/295 |
| 9,031,159 B2* | 5/2015 | Nishikawa | H04L 27/2614 375/297 |
| 9,042,469 B2* | 5/2015 | Wu | H04L 25/03159 375/260 |
| 9,083,591 B2* | 7/2015 | Nishikawa | H04L 27/2615 |
| 9,848,342 B1* | 12/2017 | McCallister | H04W 24/02 |
| 9,942,011 B2* | 4/2018 | Tang | H04L 25/03834 |
| 10,004,072 B2* | 6/2018 | Jauh | H04W 72/0453 |
| 10,018,704 B2* | 7/2018 | Wang | G01S 5/06 |
| 10,091,041 B2* | 10/2018 | Tanahashi | H04B 1/04 |
| 10,340,987 B2* | 7/2019 | McCallister | H04B 17/336 |
| 10,375,712 B2* | 8/2019 | Hsu | H04W 74/0816 |
| 10,587,448 B2* | 3/2020 | Shimizu | H04L 27/2621 |
| 10,644,916 B1* | 5/2020 | Shattil | H04L 27/2614 |
| 10,985,862 B2* | 4/2021 | Hsieh | H04W 52/04 |
| 11,368,348 B2* | 6/2022 | Hu | H04L 27/2628 |
| 11,695,609 B2* | 7/2023 | Wang | H04L 27/2634 375/262 |
| 2001/0036151 A1* | 11/2001 | Cimini, Jr. | H04L 27/2615 370/208 |
| 2002/0176480 A1* | 11/2002 | Wheatley, III | H04B 1/707 375/317 |
| 2002/0197970 A1* | 12/2002 | Jian | H04B 1/707 455/245.2 |
| 2003/0067866 A1* | 4/2003 | Jung | H04L 27/2614 370/208 |
| 2003/0202460 A1* | 10/2003 | Jung | H04L 27/2621 370/480 |
| 2004/0218689 A1* | 11/2004 | Akhtman | H04L 27/2624 375/296 |
| 2004/0264592 A1* | 12/2004 | Sibecas | H01Q 21/24 375/267 |
| 2005/0265226 A1* | 12/2005 | Shen | H04L 27/2614 370/210 |
| 2005/0265468 A1* | 12/2005 | Fujii | H04L 27/2621 375/260 |
| 2005/0265479 A1* | 12/2005 | Fujii | H04L 27/2614 375/303 |
| 2005/0270968 A1* | 12/2005 | Feng | H04L 27/2621 370/208 |
| 2005/0286648 A1* | 12/2005 | Feng | H04L 27/2621 375/260 |
| 2006/0154622 A1* | 7/2006 | Piirainen | H04B 1/04 455/114.2 |
| 2006/0193393 A1* | 8/2006 | Shen | H04L 27/2621 375/260 |
| 2006/0247898 A1* | 11/2006 | Cha | H04L 27/2614 702/188 |
| 2006/0268672 A1* | 11/2006 | Sari | H04L 27/3411 370/203 |
| 2007/0121483 A1* | 5/2007 | Zhang | H04L 27/2624 370/208 |
| 2007/0153673 A1* | 7/2007 | Tomisato | H04L 27/2614 370/480 |
| 2007/0189334 A1* | 8/2007 | Awad | H04L 27/2621 370/500 |
| 2007/0217329 A1* | 9/2007 | Abedi | H04L 5/0044 370/480 |
| 2007/0223365 A1* | 9/2007 | Tsfaty | H04L 9/00 370/208 |
| 2008/0144745 A1* | 6/2008 | Hung | H04L 25/0224 375/340 |
| 2008/0219147 A1* | 9/2008 | Hara | H04H 20/33 370/210 |
| 2008/0219372 A1* | 9/2008 | Hori | H04L 27/2614 375/261 |
| 2008/0285673 A1* | 11/2008 | Han | H04L 27/2621 375/260 |
| 2009/0060070 A1* | 3/2009 | Hayase | H04L 5/006 375/296 |
| 2009/0067517 A1* | 3/2009 | Hung | H04L 27/2659 375/341 |
| 2009/0074093 A1* | 3/2009 | Han | H04L 27/2615 375/260 |
| 2009/0086848 A1* | 4/2009 | Han | H04L 5/0023 375/295 |
| 2009/0196163 A1* | 8/2009 | Du | H04L 25/0226 370/204 |
| 2009/0201984 A1* | 8/2009 | Du | H04L 27/26524 375/240 |
| 2009/0232230 A1* | 9/2009 | Hung | H04L 5/0048 370/344 |
| 2009/0238291 A1* | 9/2009 | Hung | H04L 27/2647 375/260 |
| 2010/0054378 A1* | 3/2010 | Hung | H04L 27/16 375/344 |
| 2010/0097923 A1* | 4/2010 | Zhao | H04L 27/2636 375/297 |
| 2010/0104044 A1* | 4/2010 | Kishigami | H04L 27/2614 375/299 |
| 2010/0260248 A1* | 10/2010 | Hung | H04L 25/022 455/67.11 |
| 2010/0296385 A1* | 11/2010 | Li | H04L 27/2647 370/329 |
| 2011/0158336 A1* | 6/2011 | Jiang | H04L 27/2614 375/260 |
| 2011/0158348 A1* | 6/2011 | Ponnampalam | H04L 27/2627 375/295 |
| 2014/0219371 A1* | 8/2014 | Nishikawa | H04L 27/2614 375/260 |
| 2014/0328233 A1* | 11/2014 | Shih | H04W 52/029 370/311 |
| 2015/0010114 A1* | 1/2015 | Wu | H04L 5/0007 375/340 |
| 2015/0139212 A1* | 5/2015 | Wang | G01S 5/06 370/338 |
| 2015/0333946 A1* | 11/2015 | Terry | H04W 24/08 370/252 |
| 2016/0150540 A1* | 5/2016 | Jauh | H04W 72/0453 370/329 |
| 2017/0126458 A1* | 5/2017 | Shattil | H04L 27/2615 |
| 2017/0126459 A1* | 5/2017 | Dutronc | H04L 27/2659 |
| 2017/0188380 A1* | 6/2017 | Hsu | H04W 74/0816 |
| 2018/0062787 A1* | 3/2018 | Hsieh | H04L 5/006 |
| 2018/0219711 A1* | 8/2018 | Laporte | H04B 7/0617 |
| 2018/0270825 A1* | 9/2018 | Jauh | H04W 72/0453 |

(56) References Cited

U.S. PATENT DOCUMENTS

| | | | |
|---|---|---|---|
| 2019/0052325 A1* | 2/2019 | Murakami | H04L 27/36 |
| 2019/0173709 A1* | 6/2019 | Baek | H04L 27/2621 |
| 2019/0334755 A1* | 10/2019 | Limberg | H04L 27/28 |
| 2023/0145509 A1* | 5/2023 | Hung | H04L 5/006 |
| | | | 370/252 |
| 2023/0308332 A1* | 9/2023 | Cheng | H04L 27/263 |
| 2023/0353261 A1* | 11/2023 | Huang | H03M 1/185 |

OTHER PUBLICATIONS

Park, Phase Rotation Proposal Follow-up, slides 1-40, doc.: IEEE 802.11-20/0699r1, May 6, 2020.

Liu, Phase Rotation for 320 MHz Non-HT Duplicate Transmission and Pre-EHT modulated Fields, Slides 1-26, doc.: IEEE 802.11-21/0129r4, Jan. 4, 2021.

802.11 Working Group of the LAN/MAN Standards Committee of the IEEE Computer Society ,IEEE P802.11be / D1.2 Draft Standard for Information technology—Telecommunications and information exchange between systems Local and metropolitan area networks— Specific requirements, Part 11: Wireless LAN Medium Access Control (MAC) and Physical Layer (PHY) Specifications, Amendment 8: Enhancements for extremely high throughput (EHT), Sep. 2021.

* cited by examiner

COMMUNICATION DEVICE AND METHOD OF HANDLING PAPR

BACKGROUND OF THE INVENTION

1. Field of the Invention

The present invention relates to a communication device and a method in a wireless communication system, and more particularly, a communication device and a method of reducing a Peak-to-Average Power Ratio (PAPR).

2. Description of the Prior Art

Orthogonal Frequency Division Multiplexing (OFDM) is widely utilized in various wired communication systems and wireless communication systems. However, after OFDM signals are processed by an Inverse fast Fourier transform (IFFT), powers of the generated signals are differently greatly from each other, which leads to a Peak-to-Average Power Ratio (PAPR) of the OFDM much greater than the PAPR of a single-carrier system. The greater PAPR causes problems to a transmission of the signal, e.g., power consumption of a transmitter is much greater, or the signal of the transmission is incomplete. Thus, the PAPR of the OFDM is an important problem to be solved.

SUMMARY OF THE INVENTION

The present invention therefore provides a communication device and a method of handling a Peak-to-Average Power Ratio (PAPR) to solve the abovementioned problem.

A communication device for handling a Peak-to-Average Power Ratio (PAPR), comprises a transforming module, configured to perform a first plurality of inverse fast Fourier transforms (IFFTs) on a plurality of coefficients in a scene according to a first inverse fast Fourier transform (IFFT) size and the scene, to obtain a plurality of results; a processing module, coupled to the transforming module, configured to obtain a plurality of norms of the plurality of results, and to obtain a plurality of values of the plurality of coefficients, wherein the plurality of values are corresponding to an extreme value of the plurality of norms according to a maximum operation and a minimum operation; and a transmitting module, coupled to the processing module, configured to perform a second plurality of IFFTs on a plurality of frequency-domain signals according to a second IFFT size, the plurality of coefficients with the plurality of values and the scene, to obtain a plurality of time-domain signals, wherein the second IFFT size is greater than the first IFFT size.

A method for handling a Peak-to-Average Power Ratio (PAPR), the method comprises performing a first plurality of inverse fast Fourier transforms (IFFTs) on a plurality of coefficients in a scene according to a first inverse fast Fourier transform (IFFT) size and the scene, to obtain a plurality of results; obtaining a plurality of norms of the plurality of results, and for obtaining a plurality of values of the plurality of coefficients, wherein the plurality of values are corresponding to an extreme value of the plurality of norms according to a maximum operation and a minimum operation; and performing a second plurality of IFFTs on a plurality of frequency-domain signals according to a second IFFT size, the plurality of coefficients with the plurality of values and the scene, to obtain a plurality of time-domain signals, wherein the second IFFT size is greater than the first IFFT size.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
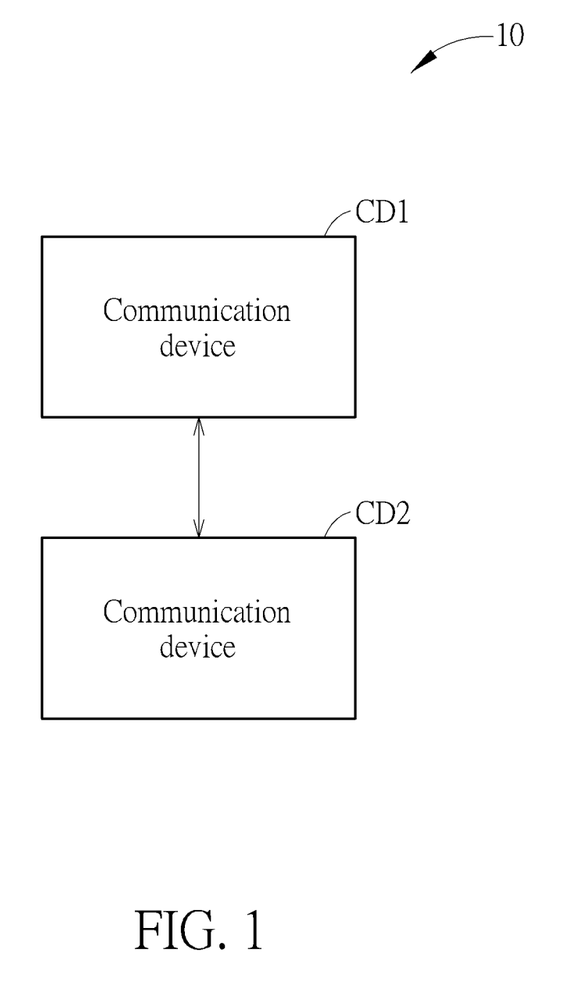
FIG. 1 is a schematic diagram of a communication system 10 according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique) or other multi-carrier communication technique, and is briefly composed of a communication device CD1 and a communication device CD2. In FIG. 1, the communication device CD1 and the communication device CD2 are utilized for illustrating the structure of the communication system 10. For example, the communication system 10 may be any wireless communication system such as a wireless local area network (WLAN), a Digital Video Broadcasting (DVB) system, a Long Term Evolution (LTE) system, a LTE-advanced (LTE-A) system or a 5th generation (5G) system (or evolved versions). The WLAN can comply with the standards of IEEE 802.11b, IEEE 802.11g, IEEE 802.11n, IEEE 802.11ac, IEEE 802.11ad, IEEE 802.11af, IEEE 802.11ax, IEEE 802.11be, etc., or the subsequent versions of these versions, and is not limited herein.

For example, the communication device CD1 (or the communication device CD2) may be a user equipment (UE), a station, a low cost device (e.g., machine type communication (MTC) device), a device-to-device (D2D) communication device, a narrow-band internet of things (IoT) (NB-IoT) device, a mobile phone, a laptop, a tablet computer, an electronic book, a portable computer system, or combination thereof. The communication device CD2 (or the communication device CD1) may be a base station in a mobile network, an access point (AP) in a WLAN, or other wireless communication devices, and is not limited herein.

Figure 2:
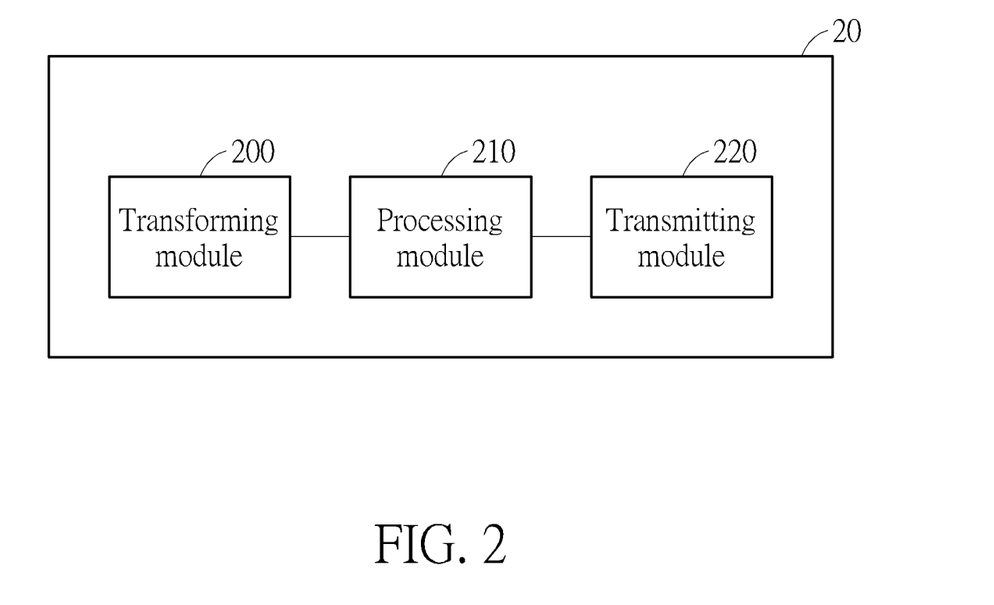
FIG. 2 is a schematic diagram of a communication system 20 according to an example of the present invention.

FIG. 2 is a schematic diagram of a communication device 20 according to an example of the present invention, for implementing the communication device CD1 (or the communication device CD2) of FIG. 1, to perform a wireless communication with the communication device CD2 (or the communication device CD1). For the ease of the description, the communication device CD1 (the communication device 20) is taken as an example to illustrate the operation of the communication device 20.

The communication device 20 includes a transforming module 200, a processing module 210 and a transmitting module 220. The transforming module 200 is configured to perform a first plurality of inverse fast Fourier transforms (IFFTs) on a plurality of coefficients in a scene according to a first inverse fast Fourier transform (IFFT) size and the scene, to obtain a plurality of results. The processing module 210, coupled to the transforming module 200, is configured to obtain a plurality of norms of the plurality of results, and to obtain a plurality of values of the plurality of coefficients. The plurality of values are corresponding to an extreme value of the plurality of norms according to a maximum operation and a minimum operation (which are in a specific performing order). The transmitting module 220, coupled to the processing module 210, is configured to perform a second plurality of IFFTs on a plurality of frequency-domain signals according to a second IFFT size, the plurality of coefficients with the plurality of values and the scene, to obtain a plurality of time-domain signals. The second IFFT size is greater than the first IFFT size.

That is, the IFFT size for searching the coefficients and the IFFT size for transmitting the signals are different. The smaller IFFT size may be utilized to search the plurality of values of the plurality of coefficients, to reduce a complexity of the operation. Thus, the communication device 20 can spend a lower computational complexity (i.e., a lower power) on determining the plurality of coefficients, and then use these coefficients to reduce a Peak-to-Average Power Ratio (PAPR) of the plurality of frequency-domain signals.

There are various implementations of the communication device 20, and are not limited to the above description. The examples below can be utilized for the communication device 20.

In one example, the abovementioned instruction of obtaining the plurality of norms of the plurality of results, and obtaining the plurality of values of the plurality of coefficients comprises:

(1) partitioning the plurality of norms into a plurality groups of norms, wherein the plurality groups of norms are corresponding to a plurality groups of candidate values of the plurality of coefficients, respectively;
(2) obtaining a plurality of maximum norms of the plurality groups of norms according to the maximum operation, wherein the plurality of maximum norms are corresponding to the plurality groups of candidate values, respectively;
(3) selecting a group of candidate values from the plurality groups of candidate values as the plurality of values according to the minimum operation, wherein the group of candidate values are corresponding to a minimum norm in the plurality of maximum norms, and the minimum norm is the extreme value.

In one example, the plurality of coefficients is corresponding to a plurality of sub-channels for transmitting the plurality of frequency-domain signals. In one example, the plurality of coefficients comprise a plurality of phases. That is, the PAPR is reduced by rotating the phases of the plurality of frequency-domain signals. In one example, the plurality of coefficients are for reducing the PAPR of the plurality of frequency-domain signals. In one example, the plurality of norms are a plurality of absolute-value norms, i.e., |·|.

In one example, the plurality of frequency-domain signals are a plurality of OFDM signals. In one example, the plurality of frequency-domain signals are a plurality of repeated signals. In one example, the plurality of frequency-domain signals comply with at least one version of the standard of IEEE 802.11.

Although the considered system is IEEE 802.11be in the following examples, the present invention can be applied to all communication systems with similar characteristics, and is not limited herein. The maximum bandwidth of the system is 320 MHz, and the coefficients for compensating the PAPR comprise the phases, i.e., a phase rotation is utilized to reduce the PAPR. After sampling a signal $r_{L\text{-}SIG}^{iTx}$ in a legacy signal (L-SIG) field, a time-domain signal r(n) can be obtained as follows:

$$r(n) = r_{L\text{-}SIG}^{iTx}(nT_s + T_{GI,PRE\text{-}EHT}), \quad (1)$$

wherein n=0, ..., 1023, $T_s$=3.125 ns and $T_{GI,PRE\text{-}EHT}$=0.8 μs. According to the equation (1), the PAPR of the time-domain signal r(n) can be obtained as follows:

$$PAPR_r = \frac{\max\{|r[n]|^2\}}{E\{|r[n]|^2\}}, \quad (2)$$

wherein max{•} is the operation for obtaining a maximum value, E{•} is the operation for obtaining an expected value, and |•| is the norm.

The equation (1) is arranged as follows to reduce the computational complexity:

$$r(n) = \sum_{i \in \Omega} \sum_{k=-28}^{28} \gamma_i D_k \exp\left[\frac{j2\pi(k-(15-2i)\cdot 32)n}{1024}\right] = \quad (3)$$

$$\exp\left[\frac{j2\pi(-480)n}{1024}\right] \sum_{i \in \Omega} \gamma_i \exp\left[\frac{j2\pi(2i\cdot 32)n}{1024}\right] \sum_{k=-28}^{28} D_k \exp\left[\frac{j2\pi kn}{1024}\right],$$

wherein $D_k$ is a modulated signal, $\Omega$ is a 20 MHz configured sub-channels set (i.e., the scene), and $\gamma_i$ is the coefficient utilized for the i-th sub-channel (i.e., a weight). $\Omega$ may also be seen as a puncture pattern. For example, $\{\gamma_0, \gamma_1, \ldots, \gamma_{15}\}$=$\{1, -1, -1, -1, \varphi_1, -\varphi_1, -\varphi_1, -\varphi_1, \ldots, \varphi_3, -\varphi_3, -\varphi_3, -\varphi_3\}$, wherein $\varphi_1, \varphi_2, \varphi_3$ are the phases. r(n) can be obtained, after performing a weighting operation (using the coefficient $\gamma_i$) and a 1024-point inverse discrete Fourier transform (IDFT) to the modulated signal $D_k$ according to the equation (3). In addition, $\gamma_i$, 0≤i≤15, are corresponding to 16 sub-channels with a 20 MHz bandwidth, respectively.

Figure 3:
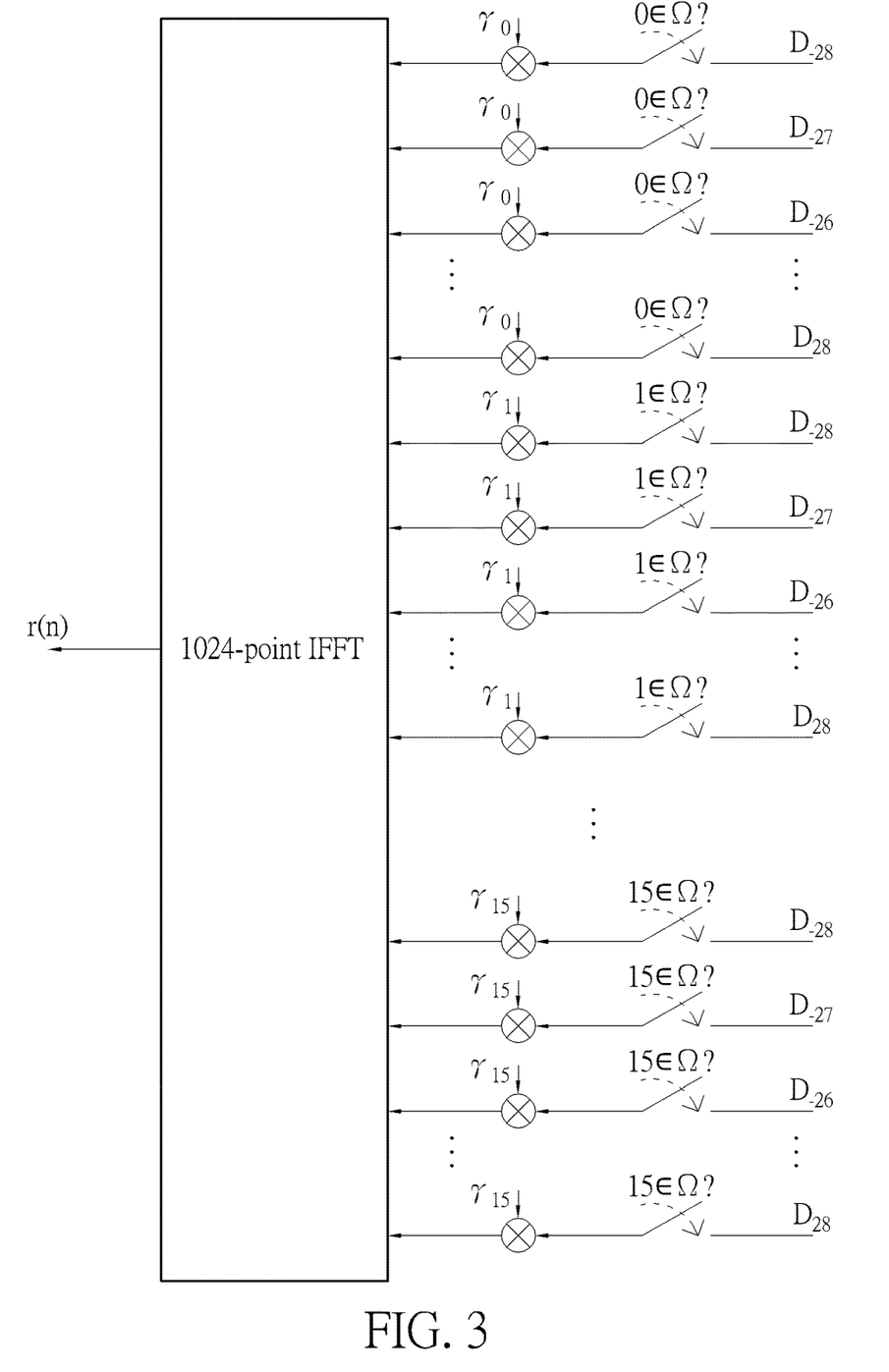
FIG. 3 is a schematic diagram of a 1024-point IFFT according to an example of the present invention.

FIG. 3 is a schematic diagram of a 1024-point IFFT according to an example of the present invention. According to FIG. 3, the same modulated signal $D_k$ may be transmitted repeatedly in different sub-channels, and the weighting operation is performed with different coefficients $\gamma_i$ on different sub-channels, respectively. The frequency-domain signals which have been processed by the weighting operation may be processed by the 1024-point IFFT, to obtain the time-domain signal r(n).

To simplify the equation (3), the present invention ignores the portion irrelevant to a peak value of the signal (e.g., $$\left(e.g., \exp\left[\frac{j2\pi(-480)n}{1024}\right]\right),$$

to approximate r(n) as follows:

$$r(n) \sim \underbrace{\left\{\sum_{i \in \Omega} \gamma_i \exp\left[\frac{j2\pi(2i\cdot 32)n}{1024}\right]\right\}}_{g(n)} \underbrace{\left\{\sum_{k=-28}^{28} D_k \exp\left[\frac{j2\pi kn}{1024}\right]\right\}}_{d(n)}, \quad (4)$$

wherein d(n) can be seen as a result obtained by performing a 64-point IFFT and a 16-time IFFT interpolation to the modulated signals $\{D_{-28}, \ldots, D_{28}\}$. g(n) can be seen as a result obtained by performing a 16-point IFFT on the coefficients $\{\gamma_0, \gamma_1, \ldots, \gamma_{15}\}$ (not comprising a punctured sub-channel).

The present invention ignores d(n) relevant to the modulated signal $D_k$ and only considers g(n) relevant to the coefficient $\gamma_i$ (e.g., the phase rotation therein) and the scene $\Omega$, to reduce the computational complexity. Thus, in a reasonably assumed scene $\Omega$, r(n)=g(n)·d(n) is correspondingly having a lower peak value (i.e., r(n) having a lower PAPR), if a specific phase rotation can make g(n) have a minimum peak value. According to the above description, the present invention proposes an algorithm for obtaining the phase $\varphi_k$ (i.e., the coefficient $\gamma_i$) as follows:

$$(\varphi_1, \varphi_2, \varphi_3) = \underset{(\varphi_1,\varphi_2,\varphi_3)}{\arg\min}\left\{\underset{0\le n\le 15}{\max}|g(n)|\right\} = \underset{(\varphi_1,\varphi_2,\varphi_3)}{\arg\min}\left\{\underset{0\le n\le 15}{\max}\left|\sum_{i\in\Omega}\gamma_i\exp\left[\frac{j2\pi in}{16}\right]\right|\right\}, \quad (5)$$

wherein min{•} is the operation for obtaining the minimum value, and arg{•} returns parameters which satisfy the condition (or the target). First, the plurality of maximum norms of the plurality groups of norms with n as a parameter are obtained according to the operation max{•}, wherein the plurality of maximum norms are corresponding to the plurality groups of candidate values, respectively. Then, according to the operation of min{•}, a minimum norm in the plurality of maximum norms are obtained, and the parameters ($\varphi_1$, $\varphi_2$, $\varphi_3$) corresponding to the minimum norm are returned.

According to the equation (5), the operation performed for obtaining the phase $\varphi_k$ is the 16-point IFFT. According to the prior art, the operation which performed for obtaining the phase $\varphi_k$ is the 1024-point IFFT. It can be inferred that the computational complexity of the prior art is about 160 times greater than the computational complexity of the present invention, since the computational complexity of a N-point IFFT is about O(N*log(N)). Thus, the computational complexity of the present invention is much smaller than the computational complexity of the prior art.

As known by those skilled in the art, an (inverse) DFT is often utilized for mathematical calculations, to obtain the algorithm through the derivation. An (inverse) FFT is often utilized to realize the (inverse) DFT, and is not limited herein. In the above description, the values of the related parameters are for clearly illustrating the examples of the present invention, e.g., the bandwidth (e.g., 20 MHz, 320 MHz), the IFFT size (e.g., 16, 64, 1024), the number of the sub-channels (e.g., 16). In fact, those skilled in the art can change the values of the parameters according to the requirement of the system and the design consideration.

Figure 4:
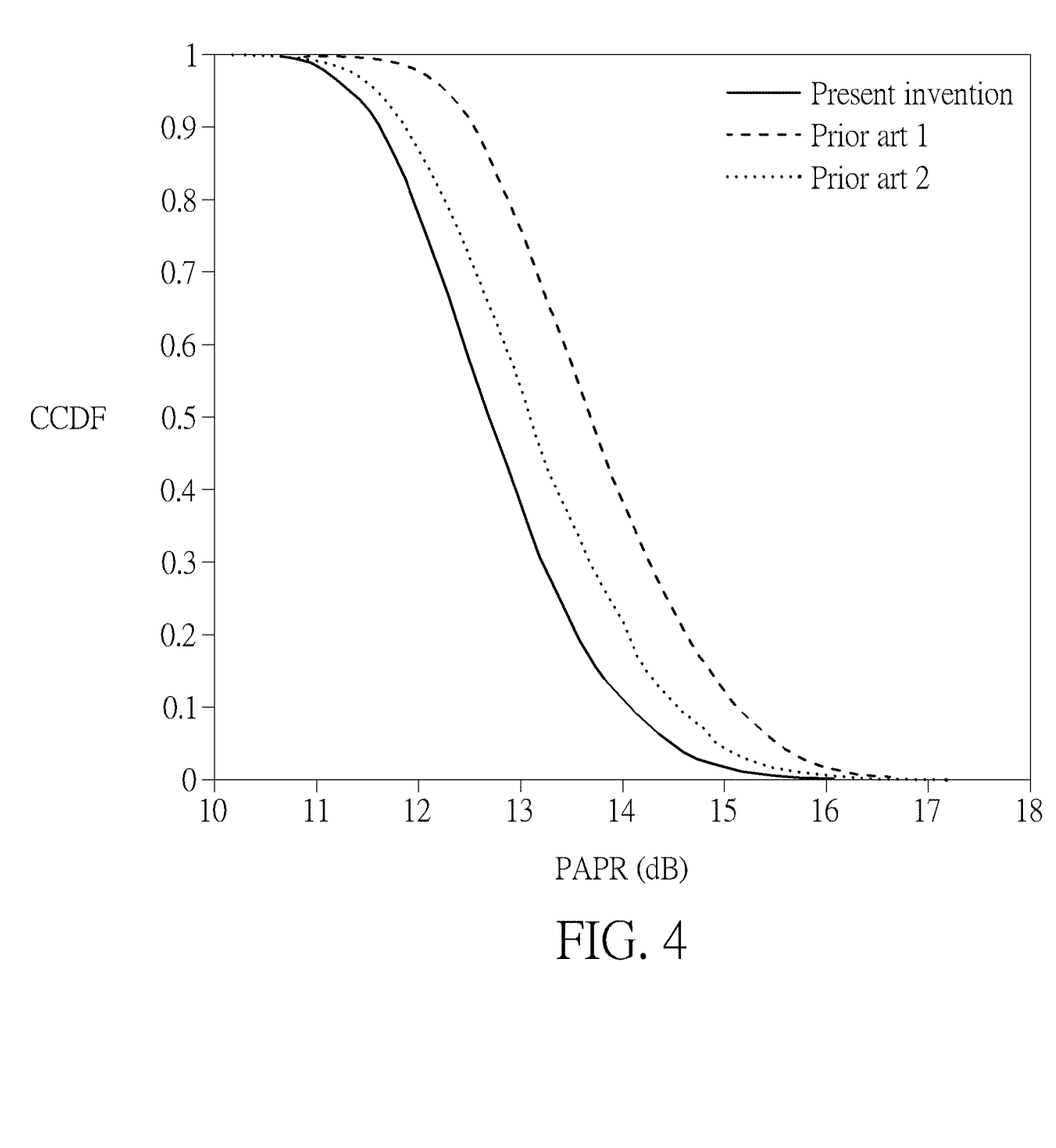
FIG. 4 is a schematic diagram of a simulation result according to an example of the present invention.

FIG. 4 is a schematic diagram of simulation results according to an example of the present invention. FIG. 4 comprises 3 results: the present invention, the prior art 1 (IEEE 802.11-20/0699r1 (36-13)) and the prior art 2 (IEEE 802.11-20/0699r1 (36-14)). The horizontal axis is the PAPR (dB), and the vertical axis is a complementary cumulative distribution function (CCDF). The coefficient utilized in the prior art 1 is as follows:

$$\gamma_{k,320} = \begin{cases} 1, & k < -448 \\ -1, & -448 \le k < -256 \\ 1, & -256 \le k < -192 \\ -1, & -192 \le k < 0 \\ -1, & 0 \le k < 64 \\ 1, & 64 \le k < 256 \\ -1, & 256 \le k < 320 \\ 1, & 320 \le k \end{cases} \quad (6)$$

The coefficient utilized in the prior art 2 is as follows:

$$\gamma_{k,320} = \begin{cases} 1, & k < -448 \\ -1, & -448 \le k < -256 \\ 1, & -256 \le k < -192 \\ -1, & -192 \le k < 0 \\ -1, & 0 \le k < 64 \\ 1, & 64 \le k < 256 \\ -1, & 256 \le k < 320 \\ 1, & 320 \le k \end{cases} \quad (7)$$

If a curve of a method is at the left side of the other method, it means that the method is with a better result than the other method (i.e., the PAPR is lower) according to the definitions of the CCDF and the PAPR. Take the PAPR 13 dB as an example, a probability of the PAPR the present invention being greater than 13 dB is about 40%, while a probability of the prior art 1 is about 76%, and a probability of the prior art 2 is about 55%.

Figure 5:
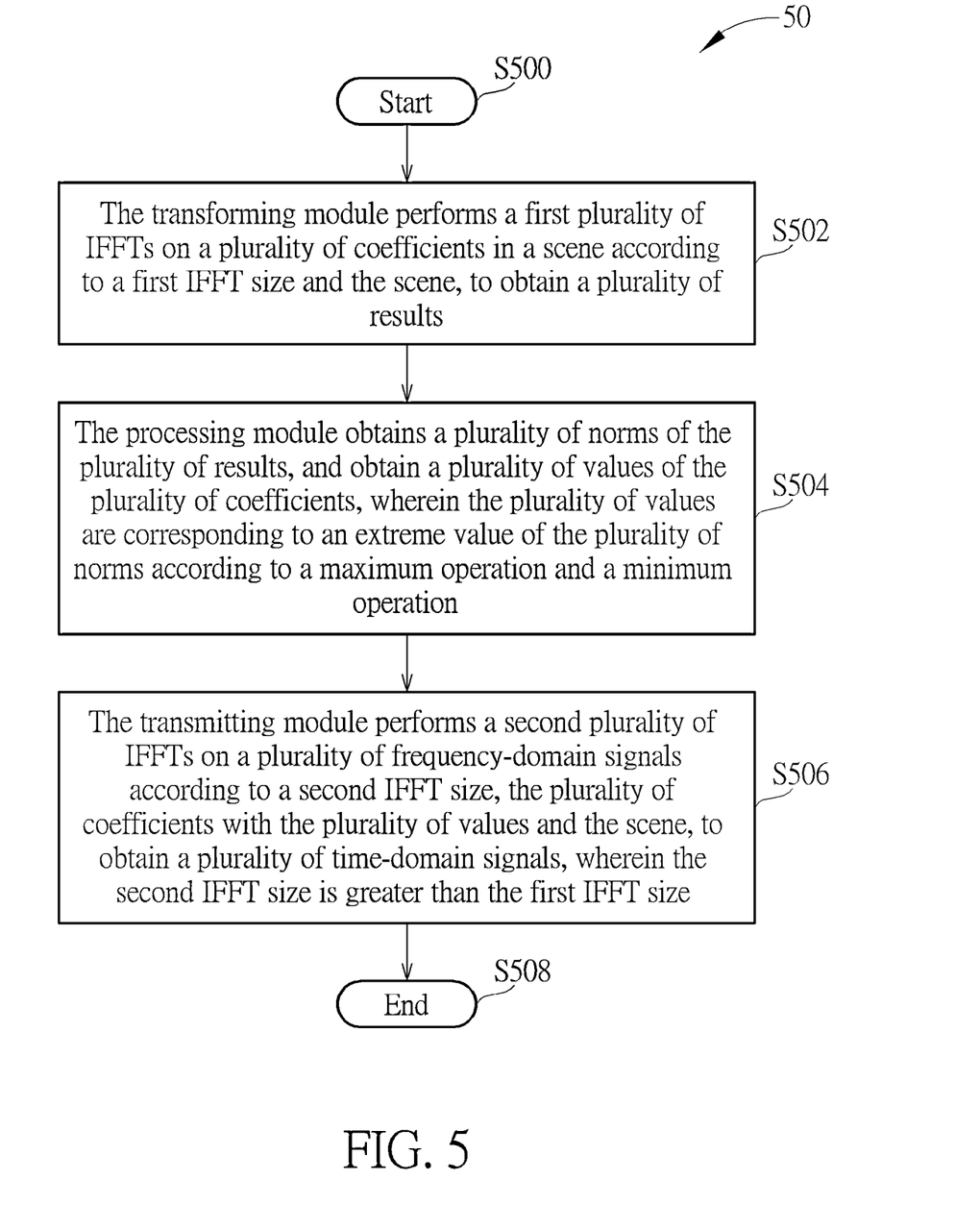
FIG. 5 is a flowchart of a process according to an example of the present invention.

Operations of the communication device 20 in the above examples can be summarized into a process 50 shown in FIG. 5. The process 50 includes the following steps:
Step S500: Start.
Step S502: The transforming module performs a first plurality of IFFTs on a plurality of coefficients in a scene according to a first IFFT size and the scene, to obtain a plurality of results.
Step S504: The processing module obtains a plurality of norms of the plurality of results, and obtain a plurality of values of the plurality of coefficients, wherein the plurality of values are corresponding to an extreme value of the plurality of norms according to a maximum operation and a minimum operation.
Step S506: The transmitting module performs a second plurality of IFFTs on a plurality of frequency-domain signals according to a second IFFT size, the plurality of coefficients with the plurality of values and the scene, to obtain a plurality of time-domain signals, wherein the second IFFT size is greater than the first IFFT size.
Step S508: End.

It should be noted that realizations of the communication device 20 (including the transforming module 200, the processing module 210, and the transmitting module 220) are various, e.g., by hardware (e.g., circuit). For another example, the modules mentioned above may be integrated into one or more modules. In addition, the communication device 20 may be realized by hardware (e.g., circuit), software, firmware (known as a combination of a hardware device, computer instructions and data that reside as read-only software on the hardware device), an electronic system or a combination of the devices mentioned above, but is not limited herein.

To sum up, the present invention provides a device and a method of handling a PAPR. The communication device can spend a lower computational complexity (i.e., a lower power) on determining the plurality of coefficients, and can use these coefficients to reduce the PAPR of the frequency-domain signals. Thus, the present invention can solve the problem of that the prior art needs a higher computational complexity to handle the PAPR, to reduce a power consumption of handling the PAPR.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a Peak-to-Average Power Ratio (PAPR), comprising:
   a transforming module, configured to perform a first plurality of inverse fast Fourier transforms (IFFTs) on a plurality of coefficients in a set of sub-channels according to a first inverse fast Fourier transform (IFFT) size and the set of sub-channels, to obtain a plurality of results;
   a processing module, coupled to the transforming module, configured to obtain a plurality of norms of the plurality of results, obtain a plurality of maximum norms of the plurality of norms according to a maximum operation, and obtain a plurality of values of the plurality of coefficients as a minimum norm of the plurality of maximum norms according to a minimum operation; and
   a transmitting module, coupled to the processing module, configured to perform a second plurality of IFFTs on a plurality of frequency-domain signals according to a second IFFT size, the plurality of coefficients with the plurality of values and the set of sub-channels, to obtain a plurality of time-domain signals, wherein the second IFFT size is greater than the first IFFT size.

2. The communication device of claim 1, wherein the instruction of obtaining the plurality of norms of the plurality of results, and obtaining the plurality of values of the plurality of coefficients comprises:
   partitioning the plurality of norms into a plurality groups of norms, wherein the plurality groups of norms are corresponding to a plurality groups of candidate values of the plurality of coefficients, respectively;
   obtaining the plurality of maximum norms of the plurality groups of norms according to the maximum operation, wherein the plurality of maximum norms are corresponding to the plurality groups of candidate values, respectively; and
   selecting a group of candidate values from the plurality groups of candidate values as the plurality of values according to the minimum operation, wherein the group of candidate values are corresponding to a minimum norm in the plurality of maximum norms, and the minimum norm is an extreme value.

3. The communication device of claim 1, wherein the plurality of coefficients are corresponding to a plurality of sub-channels for transmitting the plurality of frequency-domain signals.

4. The communication device of claim 1, wherein the plurality of coefficients comprise a plurality of phases.

5. The communication device of claim 1, wherein the plurality of coefficients are for reducing a PAPR of the plurality of frequency-domain signals.

6. The communication device of claim 1, wherein the plurality of norms are a plurality of absolute-value norms.

7. The communication device of claim 1, wherein the plurality of frequency-domain signals are a plurality of orthogonal frequency-division multiplexing (OFDM) signals.

8. The communication device of claim 1, wherein the plurality of frequency-domain signals are a plurality of repeated signals.

9. A method for handling a Peak-to-Average Power Ratio (PAPR), the method comprising:
   performing a first plurality of inverse fast Fourier transforms (IFFTs) on a plurality of coefficients in a set of sub-channels according to a first inverse fast Fourier transform (IFFT) size and the set of sub-channels, to obtain a plurality of results;
   obtaining a plurality of norms of the plurality of results, obtaining a plurality of maximum norms of the plurality of norms according to a maximum operation, and obtaining a plurality of values of the plurality of coefficients as a minimum norm of the plurality of maximum norms according to a minimum operation; and
   performing a second plurality of IFFTs on a plurality of frequency-domain signals according to a second IFFT size, the plurality of coefficients with the plurality of values and the set of sub-channels, to obtain a plurality of time-domain signals, wherein the second IFFT size is greater than the first IFFT size.

10. The method of claim 9, wherein the instruction of obtaining the plurality of norms of the plurality of results, and obtaining the plurality of values of the plurality of coefficients, comprising:
    partitioning the plurality of norms into a plurality groups of norms, wherein the plurality groups of norms are corresponding to a plurality groups of candidate values of the plurality of coefficients, respectively;
    obtaining the plurality of maximum norms of the plurality groups of norms according to the maximum operation, wherein the plurality of maximum norms are corresponding to the plurality groups of candidate values, respectively; and
    selecting a group of candidate values from the plurality groups of candidate values as the plurality of values according to the minimum operation, wherein the group of candidate values are corresponding to a minimum norm in the plurality of maximum norms, and the minimum norm is an extreme value.

* * * * *